B. G. LAMME.
WINDING FOR ELECTRICAL MACHINES.
APPLICATION FILED JUNE 2, 1905.
923,667.
Patented June 1, 1909.
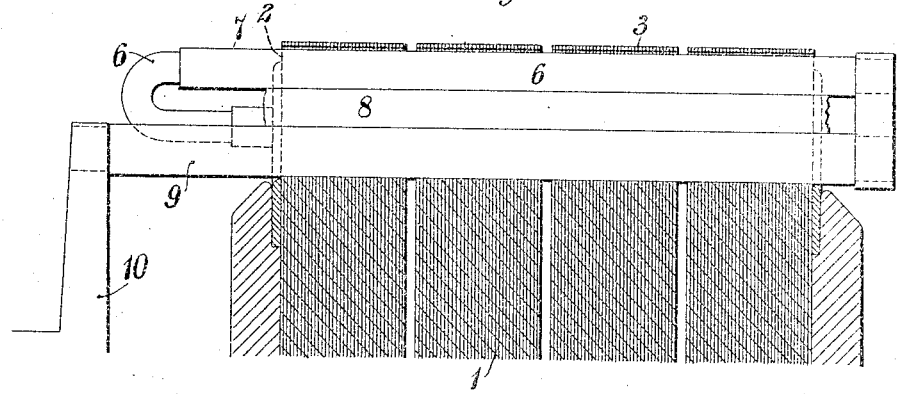
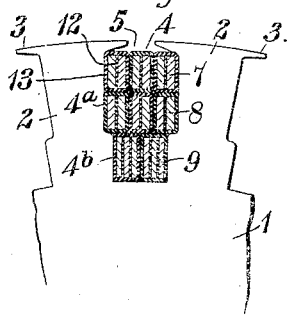
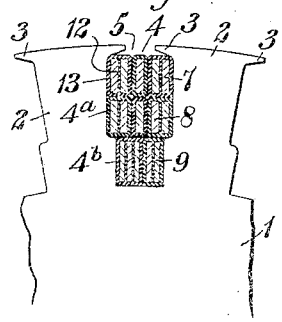
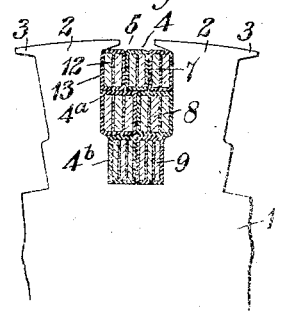
WITNESSES:
C. L. Belcher
Otto S. Schairer
INVENTOR
Benjamin G. Lamme
BY
ATTORNEY

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

WINDING FOR ELECTRICAL MACHINES.

No. 923,667.  Specification of Letters Patent.  Patented June 1, 1909.

Application filed June 2, 1905. Serial No. 263,480.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Windings for Electrical Machines, of which the following is a specification.

My invention relates to dynamo-electric machines and particularly to windings therefor.

My invention has for its object to provide an improved form of winding for use with magnetizable cores having partially closed slots.

In the construction of dynamo-electric machines, it is frequently important that the armature cores be provided with teeth the outer free ends of which project laterally to form partially closed slots between the teeth, this construction being particularly desirable where it is necessary that the ampere turns for magnetizing the core be as low as possible. With this form of core structure, the winding conductors have generally been threaded longitudinally through the slots or inserted individually through the narrow openings in the tops of the slots. When the latter method has been practiced, the conductors have been carefully and separately insulated before being inserted, because of the great difficulty of applying insulation after the conductors have once been located in the slots. If this insulation is of the usual character and is applied in the ordinary manner, the quantity employed to provide proper mechanical strength may be greater than is necessary for insulating purposes.

In some instances the core slots may be of ample dimensions to accommodate the conductors and the extra insulating material, but where it is desired to place a certain number of conductors in the slots of a core of a given diameter, it is sometimes found that the cross-sectional area of the teeth is so small as to require such an increase in the number of magnetizing ampere turns as will neutralize the benefit derived from the use of partially closed slots. In such cases, it is desirable to reduce the size of the slots, and my invention provides a winding structure that is easily applied and that requires less space than those comprising separately applied and insulated conductors.

My invention consists in dividing the conductors that are located side by side in the slots into a plurality of separately insulated groups each of which constitutes a separately applied unit, the insulation between adjacent conductors being thin as compared with that between adjacent groups. For example, if six conductors are located side by side in each slot, they may be divided into three groups with comparatively thin insulation between the two conductors of each group but with heavier insulation surrounding the groups. Thus, the heavier insulation is applied to three pairs of conductors instead of being applied to the conductors individually, and a considerable saving in the space required for insulation is effected. Other arrangements will be more specifically described hereinafter.

In the accompanying drawing Figure 1 is a longitudinal, cross-sectional view of a portion of an armature having a winding constructed in accordance with my invention. Fig. 2 is a transverse, cross-sectional view through a portion of an armature and a winding constructed in accordance with my invention, and Figs. 3 and 4 are views similar to Fig. 2 of modifications of the arrangements of winding and core slots.

A magnetizable core 1 is provided with circumferentially located teeth 2 having such laterally projecting free ends 3 that the slots 4 which are thus formed are provided with openings 5 at the circumference of the core that are narrow as compared with the body portions of the slots. As here shown, each slot 4 comprises a wide, outer portion 4$^a$ and a relatively narrow, inner portion 4$^b$, the sides of both portions being substantially parallel so that the bases of the teeth 2 are or may be of substantially the same width as the outer portions adjacent to the lateral projections 3. This structure is such as to insure a proper distribution of the magnetizable material for satisfactory operating conditions.

The winding comprises formed coils 6 which are so applied to the magnetizable core that the sides 7 constitute the outer layer and the opposite sides 8 the inner layer in the outer portions 4$^a$ of properly spaced slots. Resistance conductors 9 may connect one end of each of the coils 6 to a corresponding commutator segment 10, and these conductors may be located in the narrow portions 4ᵇ of the slots beneath the armature coil conductors, or be otherwise located, as may be desired.

If a plurality of conductors are located side by side in the slots, they may be divided into groups, individual conductors of each of which are separated by means of sufficient insulating material 12 to afford proper electrical insulation, and heavier insulation 13 may be applied to each of the groups for the purpose of separating them from each other and from the magnetizable core, the heavier insulation being employed to afford both mechanical support and electrical insulation. The width of the openings 5 at the outer sides of the slots should be such at to admit of insertion of the groups singly, and their width may be determined by the widest groups to be located in the slots. The resistance conductors 9 may also be divided into groups in a manner specified for the armature coil conductors and each group may be separately insulated and applied to the core.

The arrangements of the conductors in groups may be considerably varied from what is shown in Fig. 2, a modification of such arrangement being shown in Fig. 3, in which the inner layer of conductors, which constitutes the side 8 of the coil, is divided into two groups, while the outer layer of conductors is divided into three groups, the width of the openings 5 being such as to admit of insertion of the lower and thicker groups. It will generally be found necessary, or at least expedient, to divide the conductors for the outer layer into three groups in order to facilitate insertion, the two side groups being inserted first and then the middle group. No difficulty need ordinarily be experienced in inserting the groups which constitute the inner layer, because of the ample amount of space in the outer portions of the slots within which the groups may be adjusted during insertion. If an odd number of conductors be placed side by side in the slots, they may be divided into groups having unequal numbers of conductors per group, so as to provide an odd number of groups, such an arrangement being shown in Fig. 4. The resistance conductors 9 may also be divided into a plurality of groups of an unequal number of conductors per group, as indicated in Fig. 4, the number of groups being either equal to or different from the number of groups of armature conductors per layer. Other arrangements of the armature conductors and also of the resistance conductors may be employed, and obviously similar arrangements may be employed for other numbers of conductors, and the details of construction and arrangement be further varied without departing from the scope of my invention.

I claim as my invention:

1. In a dynamo-electric machine, the combination with a magnetizable core having longitudinal, peripheral slots the openings of which are centrally located and are narrower than the body portions thereof, of a winding the conductors of which are arranged in the core slots in a plurality of layers of separately insulated groups having an uneven number of groups per layer.

2. In a dynamo-electric machine, the combination with a magnetizable core having longitudinal, peripheral slots the openings of which are centrally located and are less than half the width of the body portions thereof, of a winding the conductors of which are arranged in the core slots in a plurality of layers of separately insulated groups having an uneven number of groups per layer, the width of each group being equal to or less than the width of the slot openings.

3. In a dynamo-electric machine, the combination with a magnetizable core having longitudinal, peripheral slots, of a winding the conductors of which are arranged in the core slots in a plurality of layers of separately insulated groups having an uneven number of groups per layer the number of conductors in each of which is different from that in one or more of the other groups.

4. In a dynamo-electric machine, the combination with a magnetizable core having longitudinal, peripheral slots the openings of which are narrower than the body portions thereof, of a winding the conductors of which are arranged in the core slots in a plurality of layers of separately insulated groups, having an uneven number of groups per layer, the number of conductors in each group being different from that in one or more of the other groups.

5. In a dynamo-electric machine, the combination with a magnetizable core having longitudinal, peripheral slots the openings of which are narrower than the body portions thereof, of a winding the conductors of which are arranged in the core slots in a plurality of layers of separately insulated groups having an unequal number of conductors per group and an uneven number of groups per layer, the width of the thickest group being equal to or less than the width of the slot openings.

6. In a dynamo-electric machine, the combination with a magnetizable core having longitudinal, peripheral slots the openings of which are narrower than the body portions thereof and are centrally disposed with reference thereto, of a winding the conductors of which are arranged in the core slots in a plurality of layers of separately insulated groups having an unequal number of conductors per group and an uneven number of groups per layer, the width of each group being less than the width of the slot openings.

7. In a dynamo-electric machine, the combination with a magnetizable core having longitudinal, peripheral slots the openings of which are centrally located and are materially narrower than the body portions thereof, of a winding the conductors of which are arranged in the slots, in a plurality of layers of separately insulated groups having an uneven number of groups per layer, the width of each group being equal to or less than the width of the slot openings, a commutator, and resistance conductors for connecting the winding with the commutator, the resistance conductors being also arranged in the slots in a plurality of separately insulated groups.

8. In a dynamo-electric machine, the combination with a magnetizable core provided with longitudinal, peripheral slots having relatively narrow, centrally located openings, wide outer portions and narrow inner portions, of a winding the conductors of which are arranged in the outer, wide portions of the slots in a plurality of separately insulated groups, a commutator, and resistance conductors located in the inner, narrow portions of the slots for connecting the winding to the commutator.

9. In a dynamo-electric machine, the combination with a magnetizable core provided with longitudinal, peripheral slots having relatively narrow, centrally located openings, wide outer portions and narrow inner portions, of a winding the conductors of which are arranged in the outer, wide portions of the slots in a plurality of separately insulated groups disposed in layers having a plurality of groups per layer, the width of each group being equal to or less than the width of the slot openings, a commutator, and resistance conductors located in the narrow, inner portions of the slots for connecting the winding with the commutator.

10. In a dynamo-electric machine, the combination with a magnetizable core provided with longitudinal, peripheral slots having relatively narrow, centrally located openings, wide outer portions and narrow inner portions, of a winding the conductors of which are arranged in the wide outer portions of the slots in a plurality of separately insulated groups, a commutator, and resistance conductors for connecting the winding to the commutator, said conductors being located in the narrow inner portions of the slots and arranged in a plurality of separately insulated groups.

11. In a dynamo-electric machine, the combination with a magnetizable core having longitudinal, peripheral slots the openings of which are narrower than the body portions thereof and that are centrally disposed with reference thereto, of a winding the conductors of which are arranged in the core slots in a plurality of layers of separately insulated groups having an uneven number of groups per layer, none of said groups being wider than the opening of the slot in which it is located.

In testimony whereof, I have hereunto subscribed my name this 31st day of May, 1905.

BENJ. G. LAMME.

Witnesses:
 ELIZABETH LIVINGSTONE,
 BIRNEY HINES.